(No Model.) 2 Sheets—Sheet 2.

J. E. GOMBAULT & E. C. SONNET.
SHIP'S LOG OR APPARATUS FOR INDICATING AND RECORDING THE SPEED OF VESSELS.

No. 477,530. Patented June 21, 1892.

WITNESSES:
John Revell
G. M. Copenhaver.

INVENTORS
Joseph E. Gombault &
Eugene C. Sonnet
BY
Howson and Howson
their ATTORNEYS

UNITED STATES PATENT OFFICE.

JOSEPH EUGÈNE GOMBAULT AND EUGEN CHARLES SONNET, OF PARIS, FRANCE.

SHIP'S LOG OR APPARATUS FOR INDICATING AND RECORDING THE SPEED OF VESSELS.

SPECIFICATION forming part of Letters Patent No. 477,530, dated June 21, 1892.

Application filed August 19, 1891. Serial No. 403,118. (No model.) Patented in France October 6, 1890, No. 208,670.

*To all whom it may concern:*

Be it known that we, JOSEPH EUGÈNE GOMBAULT and EUGEN CHARLES SONNET, engineers, citizens of the Republic of France, residing at Paris, in the Republic of France, have invented certain Improvements in Ships' Logs or Apparatus for Indicating and Recording the Speed of Vessels, (for which we have obtained a French patent dated October 6, 1890, No. 208,670,) of which the following is a specification.

This invention relates to a log or apparatus which indicates and records or registers the speed of the ship or vessel by which it is carried. This log, which we term the "graphic log," is not affected by the influence of the sea or currents which may be running with or against the course of the ship, as is the case in ordinary logs. Moreover, it admits of being regulated with precision, so as to obtain accurate indications independently of the degree of immersion or the form or length of the vessel. This graphic log is based on the employment of a column of air of adjustable volume communicating with a manometric tube or pressure-gage connected with a needle or pointer, one end of which shows the speed for the time being at any moment, while the other extremity records the speed in the form of a diagram or line drawn upon a flat disk rotated at a uniform rate by means of clock-work. This disk, being divided into spaces representing hours and miles, for example, (measures of time and distance,) and upon which the curve or diagram of the speeds is automatically traced, indicates the total distance traversed by the vessel and its speed at all periods of the voyage. It also shows the periods during which the vessel has been moving and those during which it has remained stationary. The graphic log is thus enabled to provide the captain or sailing-master with accurate indications, which may be preserved as reliable records of the voyage.

Figure 1:
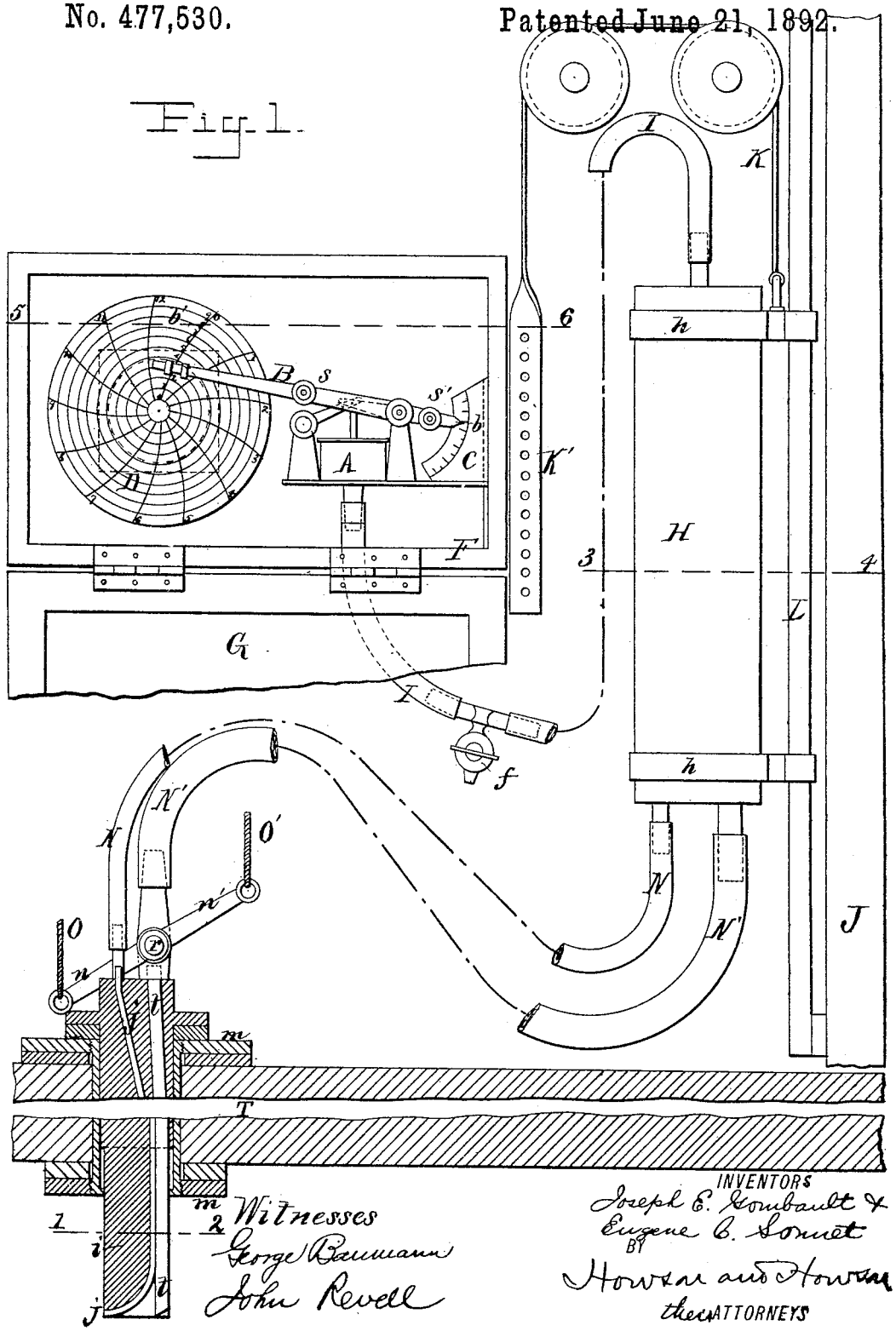
Figure 2:
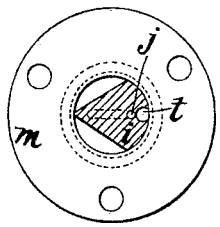
Figure 3:
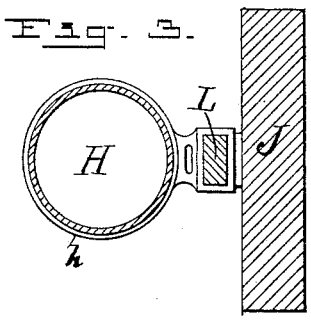
Figure 4:
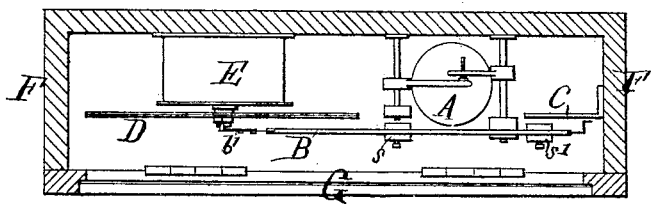

Figure 1 of the accompanying drawings represents in elevation and partly in section a general arrangement of a graphic log constructed according to this invention, the parts being represented as arranged in proximity to one another with a view to economizing space in the drawings; but it is evident in practice that the several parts will be arranged in different parts of the vessel. Fig. 2 represents a part of the apparatus in section on the line 1 2, Fig. 1. Fig. 3 represents another part in section on the line 3 4, Fig. 1. Fig. 4 represents a registering apparatus in section, the section being taken on the line 5 6, Fig. 1.

The principal parts of the graphic log consist of the parts directly communicating with the water, an air-chamber and compensator, and a registering or recording apparatus.

*Parts in direct communication with the water.*—The parts in direct communication with the water are situated as near as possible to the keel and at a point at about one-third of the length of the ship from the stern. They consist of a nozzle and small pipe or tube $j$ of fine bore, (about one and one-half millimeters in section.) This pipe is embedded and protected in the interior of a piece of metal $i$, attached in any suitable manner in a tube or sheath T, passed through the shell of the ship in a suitable position. This sheath is attached to the shell by means of flanges $m$ with water-tight packing or by any other suitable means.

In the case of wooden ships it is indispensable to provide an external joint, but in the case of iron ships the joint may be made on the inside only. In all cases the external part of the piece $i$ is of triangular form in section, as represented in Fig. 2, in order to present the least possible resistance, and the tube $j$ is bent forward horizontally under the end of this piece.

In the piece $i$ there is another tube $t$, the lower extremity of which is cut at an angle, or it may be slightly bent backward or toward the rear. The inner part of this tube is provided with a cock or valve $r$, connected to a lever $n\, n'$, attached to the cords or chains $o\, o'$, which may be worked from the space where the registering apparatus is situated, or from any other convenient part of the vessel by means of suitable guide-pulleys. The pipes $j$ and $t$ are connected by means of flexible or other tubes N N' with an air-chamber H, which may be situated at any convenient distance from the water.

*Air-chamber.*—This chamber H, which is preferably constructed of a capacity equal to about one cubic decimeter, is supported by collars $h$, sliding upon a vertical rod L, firmly attached to the support or bulk-head J, arranged as nearly as possible above the point where connection is made with the water and at such a height as to enable the said air-chamber to be adjusted on a level with the surface of the water. A lanyard cord or chain K enables the air-chamber to be adjusted vertically by sliding upon the rod L. The extremity K′ of the cord or the like is so arranged, being provided with knots, holes, or the like, as to enable it to be fixed in any required position for the purpose of adjusting the chamber H at different levels. The guide-pulleys over which the lanyard cord or chain K works are preferably arranged in such a manner that the part K′ is in the vicinity of the registering apparatus or recorder hereinafter described.

*Graphic recorder.*—The recording or registering apparatus is provided with a disk D of paper, card, or the like, attached by suitable means to a metal plate keyed upon a spindle, receiving a slow rotary movement, being caused to describe one complete revolution per hour—for example, by means of a suitable combination of clock-work E. This paper disk is printed beforehand with a number of equidistant concentric circles and with a series of radial arcs of circles passing through the center of the disk, being struck up on a radius equal to the distance separating the said axis from the center or axis of the disk. The concentric circles represent speeds in nautical miles or knots, and are numbered from the center toward its periphery, and the radial arcs represent hours, half-hours, and quarters of hours, so as to indicate the distance traversed. Any convenient number of circles and arcs of circles may be employed. A style or marking-instrument $b'$, attached to the extremity of a lever B, is arranged in front of this disk. The said lever B receives angular or vibrating movement from a manometer A, connected by means of a flexible pipe I with the upper part of the air-chamber H. The short arm of the lever B forms a pointer $b$, traveling over a fixed dial C, graduated so as to represent nautical miles or knots. The lever B is also provided with slides $s$ $s'$, enabling the action of the apparatus to be adjusted or regulated. The registering apparatus or recorder thus constituted and inclosed in a box F, provided with a glazed door or lid G, is placed in a suitable position, such as the captain's cabin or in the deck-house, for example.

*Action of the apparatus.*—When the parts are at rest—that is to say, when the vessel is in port or at anchor—the cock $r$ is fully opened and retained in this position by means of the cords or chains $o$ $o'$. This cock is always open when the ship is stationary, as well as the air-inlet cock $f$, placed on the side of the pipe I. Under these conditions the level of the water in the interior of the apparatus is at the same height as at the exterior. The cock $f$ is simply a vent-cock to let air out of or into the pipe I, but does not close the passage in the pipe. When the ship commences to move through the water, the cocks $f$ and $r$ are closed, care being taken to close the cock $f$ before the cock $r$ is closed. It is essential to perform these two operations at the moment of starting and also to close the cocks one after the other, as explained, because if the cock $r$ were closed before the cock $f$ the column of water would rise without producing any pressure on the manometer, as the air in the tube I would escape through the cock $f$, and the column having attained its elevation the closing of the cock $f$ would be without effect. When these cocks are closed, the chamber H is adjusted by means of the cord or chain K (which is graduated at its upper extremity K′) in such a manner as to bring the lower part of the chamber H about one hundred millimeters above the line of flotation or level of the water. When the ship advances, water is forced into the pipes through the nozzle or small pipe $j$ with a force proportionate to the speed of the vessel. This water compresses the air which is contained in the chamber H. This compressed air reacts in the manometer A and displaces the lever B, causing the extremity of the latter to move over the disk D. The amplitude of the movement of the lever is in direct proportion to the pressure, which in turn increases or diminishes according to the speed of the ship. The said lever being provided with a tracer $b'$ and the disk D being caused to rotate by the clock-work, it results that a curve or diagram is traced upon the disk representing with great accuracy the speed of the ship at every moment as well as the distance traversed. The disk thus not only shows the variations in the speed, but also indicates the time at which they take place. It also indicates the times of the stoppages and the distances traversed in a given time. It is, in short, a record of all the phases of the movement, enabling the time to be compared with the distance. Moreover, the indicator $b$ indicates upon the fixed part C the present speed of the vessel. In case of any doubt as to the correct working of the apparatus it is simply necessary to pull the chain $o$ $o'$ so as to open the cock $r$. The area of the passage through this cock being considerable in proportion to the quantity of water admitted through the nozzle or small pipe $j$, it results that the water forced into the apparatus returns freely to the sea through the pipe $t$, and the lever B of the register apparatus returns to zero. The cock $f$ is then opened for a very short period only, in order to re-establish the equilibrium, after which the cock $f$ is again closed, the cock $r$ being subsequently closed, and then if the apparatus is working accurately the lever B indicates the same speed as before.

*Adjustment of the apparatus.*—The shape and dimensions of the ship affect the force with which the liquid is forced into the small pipe *j* relatively to the speed of the vessel, so that it is necessary to provide means for regulating the graphic log. This may be done in various ways. In the first place the divisions on the disk D may be made wider or narrower, or the sliding weights *s s'* may be adjusted upon the lever B so as to accelerate or retard its action, or the air-chamber H may be raised or lowered by means of the cord or chain K.

In order to repair or inspect the tube or nozzle *j*, it is simply necessary to loosen the joint which connects the part *i* to the sheath T and to remove the part *i* and close the orifice with a plug or otherwise.

The disk D is provided with thirteen divisions representing the hours, in place of twelve, so as to afford time for changing the disk when it has completed a revolution.

In conclusion, it is to be observed that the dimensions of the apparatus may be regulated according to requirements, and that its several parts may be constructed of any suitable material.

The air-chamber H may be directly combined with the parts in communication with the water, the latter in this case being placed in the sides of the ship to port or starboard without in any way affecting the indications given.

We claim—

1. A ship's log comprising a movable air-chamber, a pipe connecting the said air-chamber with the water, and a manometric indicating and recording apparatus connected to the air-chamber, all substantially as and for the purposes set forth.

2. A ship's log comprising a movable air-chamber, a pipe connected to the air-chamber and having its extremity beneath the water and bent in the direction of the movement of the ship, a manometer connected to the air-chamber, and a rotating disk and marker therefor, the said marker actuated by the manometer, all substantially as and for the purpose set forth.

3. In a ship's log, the combination of an air-chamber, a fixed support, upon which the air-chamber is adapted to slide to be adjusted on a level with the water-line, a manometric indicating and recording apparatus, a pipe communicating with the water in the direction of the movement of the ship, and flexible tubing connecting the air-chamber with the manometer and with the said pipe, all substantially as and for the purposes set forth.

4. In a ship's log, the combination of an air-pipe provided with a manometer and connected to a pipe having its extremity below the water, with a rotating disk, a fixed dial, and a lever B, actuated by the manometer and provided at one end with a marker adapted to mark upon the rotating disk and at the other end with an indicating-needle for the said dial, all substantially as and for the purposes set forth.

5. A ship's log comprising an adjustable air-chamber, a manometric recording and indicating apparatus, a tube connecting the manometer with the air-chamber and provided with a cock open to the atmosphere, and two pipes each connected to the air-chamber and communicating with the water, one in the direction of the movement of the ship, the other in the opposite direction, the latter being provided with a stop-cock, all substantially as and for the purposes set forth.

6. In a ship's log, the combination of an adjustable air-chamber provided with a manometer, with a piece *i* of triangular section set into the hull of the ship and carrying a water-inlet tube *j* and discharge-tube *t*, each connected to the said air-chamber, all substantially as and for the purposes set forth.

In testimony whereof we have signed our names to this specification in the presence of two subscribing witnesses.

JOSEPH EUGÈNE GOMBAULT.
EUGEN CHARLES SONNET.

Witnesses:
LÉON FRANCKEN,
ROBT. M. HOOPER.